(12) United States Patent
Hamilton, II et al.

(10) Patent No.: US 8,051,462 B2
(45) Date of Patent: Nov. 1, 2011

(54) SECURE COMMUNICATION MODES IN A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); Anne R. Sand, Peyton, CO (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 12/117,866

(22) Filed: May 9, 2008

(65) Prior Publication Data

US 2009/0282472 A1 Nov. 12, 2009

(51) Int. Cl.
*G06F 7/00* (2006.01)
(52) U.S. Cl. .......................................... 726/2; 709/225
(58) Field of Classification Search .................. None
See application file for complete search history.

(56) References Cited

U.S. PATENT DOCUMENTS

| | | | |
|---|---|---|---|
| 5,880,731 A * | 3/1999 | Liles et al. ..................... 715/758 |
| 6,229,533 B1 * | 5/2001 | Farmer et al. ................. 345/473 |
| 6,734,885 B1 | 5/2004 | Matsuda |
| 6,772,195 B1 | 8/2004 | Hatlelid et al. |
| 7,124,092 B2 | 10/2006 | O'Toole, Jr. et al. |
| 7,840,668 B1 * | 11/2010 | Sylvain et al. ................. 709/224 |
| 2003/0051136 A1 | 3/2003 | Curtis et al. |
| 2003/0156134 A1 * | 8/2003 | Kim .............................. 345/753 |
| 2004/0179037 A1 | 9/2004 | Blattner et al. |
| 2007/0276958 A1 * | 11/2007 | Curtis et al. .................. 709/238 |
| 2008/0262911 A1 * | 10/2008 | Altberg et al. .................. 705/14 |
| 2009/0138943 A1 * | 5/2009 | Kawanaka ........................ 726/4 |
| 2009/0210803 A1 * | 8/2009 | Brignull et al. .............. 715/757 |
| 2009/0249228 A1 * | 10/2009 | Cheng et al. ................. 715/758 |
| 2009/0254968 A1 * | 10/2009 | Bussani et al. .................... 726/1 |
| 2010/0229235 A1 * | 9/2010 | Dawson et al. ................. 726/22 |
| 2010/0332827 A1 * | 12/2010 | Garcia et al. ................. 713/168 |

* cited by examiner

*Primary Examiner* — Nathan Flynn
*Assistant Examiner* — Michael R Vaughn
(74) *Attorney, Agent, or Firm* — William Scheisser; Hoffman Warnick LLC

(57) ABSTRACT

The present invention is directed to a system, method and program product for providing secure communications in a virtual universe. A system is disclosed that includes a system for allowing a first avatar to request a secure communication mode and for allowing a second avatar to accept the secure communication mode. Once accepted, a secure session is initiated within the virtual universe between the first avatar and the second avatar and at least one feature of the virtual universe is altered to effectuate the secure communication mode.

20 Claims, 2 Drawing Sheets

SECURE COMMUNICATION MODES IN A VIRTUAL UNIVERSE

FIELD OF THE INVENTION

The present invention relates to virtual environments, and more specifically relates to a system, method and program product for providing secure communication modes in a virtual universe.

BACKGROUND OF THE INVENTION

A virtual environment is an interactive simulated environment accessed by multiple users through an online interface. Users inhabit and interact in the virtual environment via avatars, which are two or three-dimensional graphical representations of humanoids. There are many different types of virtual environments, however there are several features many virtual environments generally have in common:
A) Shared Space: the world allows many users to participate at once.
B) Graphical User Interface: the environment depicts space visually, ranging in style from 2D "cartoon" imagery to more immersive 3D environments.
C) Immediacy: interaction takes place in real time.
D) Interactivity: the environment allows users to alter, develop, build, or submit customized content.
E) Persistence: the environment's existence continues regardless of whether individual users are logged in.
F) Socialization/Community: the environment allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual environments (e.g., universes, worlds, etc.), such as that provided in the on-line world Second Life (Second Life is a trademark of Linden Research in the United States, other countries, or both). The Second Life client program provides its users (referred to as residents) with tools to view, navigate, and modify the Second Life world and participate in its virtual economy.

Second Life and other on-line virtual environments present a tremendous new outlet for both structured and unstructured virtual collaboration, gaming and exploration, as well as real-life simulations in virtual spaces. These activities, along with yet to be disclosed new dimensions, in turn provide a wide open arena for creative and new communication methods and mechanisms.

As with any form of communication, there may be occasions when it becomes desirable to securely communicate with other avatars. While facilities such as private chat and invitation only areas currently exist in virtual universes, they often do not provide an effective mechanism for providing secure communication. In view of the foregoing, there exists a need for an approach that addresses at least one of the deficiencies of the related art.

SUMMARY OF THE INVENTION

A first aspect of the present invention is directed to a system for providing secure communications in a virtual universe, comprising: a request/acceptance system for allowing a first avatar to request a secure communication mode and for allowing a second avatar to accept the secure communication mode; a system for initiating a secure session within the virtual universe between the first avatar and the second avatar; and a characteristics alteration system that alters a feature of the virtual universe to effectuate the secure communication mode.

A second aspect of the present invention is directed to a method of providing secure communications in a virtual universe, comprising: receiving a request from a first avatar for a secure communication mode; receiving an acceptance from a second avatar for the secure communication mode; initiating a secure session within the virtual universe between the first avatar and the second avatar; and altering a feature of the virtual universe to effectuate the secure communication mode.

A third aspect of the present invention is directed to a program product stored on a computer readable medium for providing secure communications in a virtual universe, the program product comprising: program code for receiving a request from a first avatar for a secure communication mode; program code for receiving an acceptance from a second avatar for the secure communication mode; program code for initiating a secure session within the virtual universe between the first avatar and the second avatar; and program code for altering a feature of the virtual universe to effectuate the secure communication mode.

A fourth aspect of the present invention is directed to a method for deploying an application for providing secure communications in a virtual universe, comprising: providing a computer infrastructure being operable to: receive a request from a first avatar for a secure communication mode; receive an acceptance from a second avatar for the secure communication mode; initiate a secure session within the virtual universe between the first avatar and the second avatar; and alter a feature of the virtual universe to effectuate the secure communication mode.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
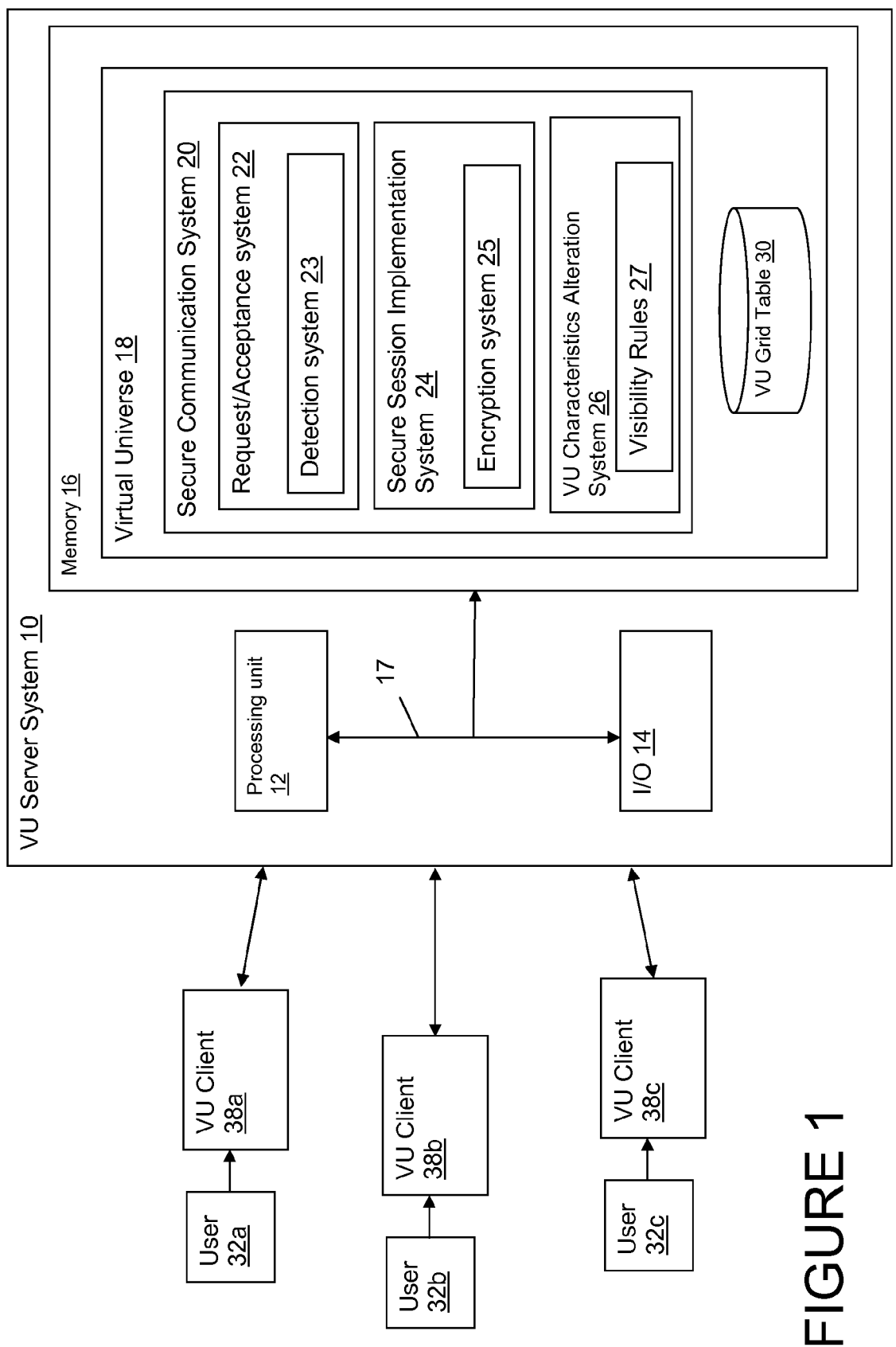
FIG. 1 depicts a virtual universe infrastructure in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring now to the drawings, FIG. 1 depicts a virtual universe infrastructure that includes a virtual universe (VU) server system 10 for implementing and serving a virtual universe 18 over a network, and a plurality of virtual universe (VU) clients 38a,b,c that provide access to the virtual universe 18 for users 32a,b,c. In general, users 32a,b,c access virtual universe 18 from remote computers running VU clients 38a,b,c. Remote computers may comprise any type of computing device, e.g., a personal computer, a laptop, a handheld device, etc. Within virtual universe 18, each user 32a,b,c is represented as an avatar, which can be navigated around the virtual universe 18 by the user 32*a,b,c*.

Within virtual universe 18 is a secure communication system 20 that allows avatars to communicate amongst each other in a secure communication mode. Thus, for example, user 32*a* could communicate with user 32*b* secretly to the exclusion of user 32*c*. Secure communication system 20 provides mechanisms for securing all types of communications occurring within virtual universe 18, such as conversations and dialogs, text based communications, digitized voice and video, physical avatar actions (e.g., handing someone a confidential document, showing someone a private item from their inventory, gestures, etc.), etc.

Thus, the term "secure communication mode" as used herein, may refer to any mode in which information can be transmitted within virtual universe 18 to the exclusion of others, including, e.g., holding private conversations (i.e., dialogs others cannot listen to), visual masking (i.e., physical actions others cannot see), location masking (i.e., hiding the location of avatars), teleportation (i.e., moving avatars to private areas), data encryption, etc. As such, secure communication system 20 may provide for a plurality of dynamic ways to hide interactions or communications among avatars.

Secure communication system 20 includes: a request/acceptance system 22 that allows two or more avatars to initiate a secure communication mode; a security session implementation system 24 that initiates a secure session and dictates the type of secure communication mode and level of security to be provided; and a virtual universe (VU) characteristics alteration system 26 that makes any necessary environment changes to one or more features within the virtual universe 18 to effectuate the secure communication mode, e.g., making avatars engaged in a secure communication disappear to the rest of the virtual universe 18, or just aspects of their communications disappear.

Request/acceptance system 22 includes a plurality of possible actions that avatars can take to engage in a secure communication mode. For example, a first avatar could hand other avatars a privacy token in the shape of a gold coin to request a secure communication mode. Privacy tokens may be inventory objects that every avatar has (where there are an infinite number of tokens, and the effect and existence of any given token only exists until the secure communication is terminated by either party). Taking the token signifies acceptance.

Alternatively, a first avatar can send a message to other avatars including a privacy code word, which may be randomly generated. Receiving avatars may message it back to signify acceptance. In a further embodiment, avatars could fly through a dedicated privacy ring that one of the avatars creates to signify mutual request and acceptance.

Still further embodiments may include: an avatar performing a gesture (e.g., a "secret" handshake, wink with a nod, etc.) to other avatars, wherein a gesture back signifies acceptance; an avatar selecting a few avatars in his or her area and clicking a button to enter into confidentiality mode, or speaking "Shhhhh" into his or her microphone; clicking on another avatar and selecting an option to invite the avatar to a secure communication mode; providing a privacy group that is pre-established, then enabling a session with a single click. For example, a rule may be pre-established that if two avatars are wearing a corporate logo hat, only a single click is required to initiate a secure communication mode or that it is automatically created. Similarly, avatars belonging to a group may have an inventory object, such that when holding the inventory object, they enter into secure communication mode.

Detection system 23 may also be included to automatically detect situations that appear to involve sensitive exchanges and prompt the avatar(s) to enter a secure communication mode. For instance, a language parser could be utilized to examine public conversations and determine if a conversation appears to be of a sensitive nature. Detection system 23 may be implemented by parsing text, audio, video, and matching it against a look-up table of likely words or phrases that connote some type of sensitive communication, e.g., work or intimate conversation. This may be responsive to any known group affiliation (such as through registration and a look-up with a trusted third party, declaration by an individual, some common and determinable characteristic such as IP subnet, country, etc.), user profile similarity, or a shared item in the users' inventories. Parsing sensitivity, lists of key words, group affiliation, inventory items, and use of this automatic method may be configurable by the users 32*a,b,c*.

Figure 2:
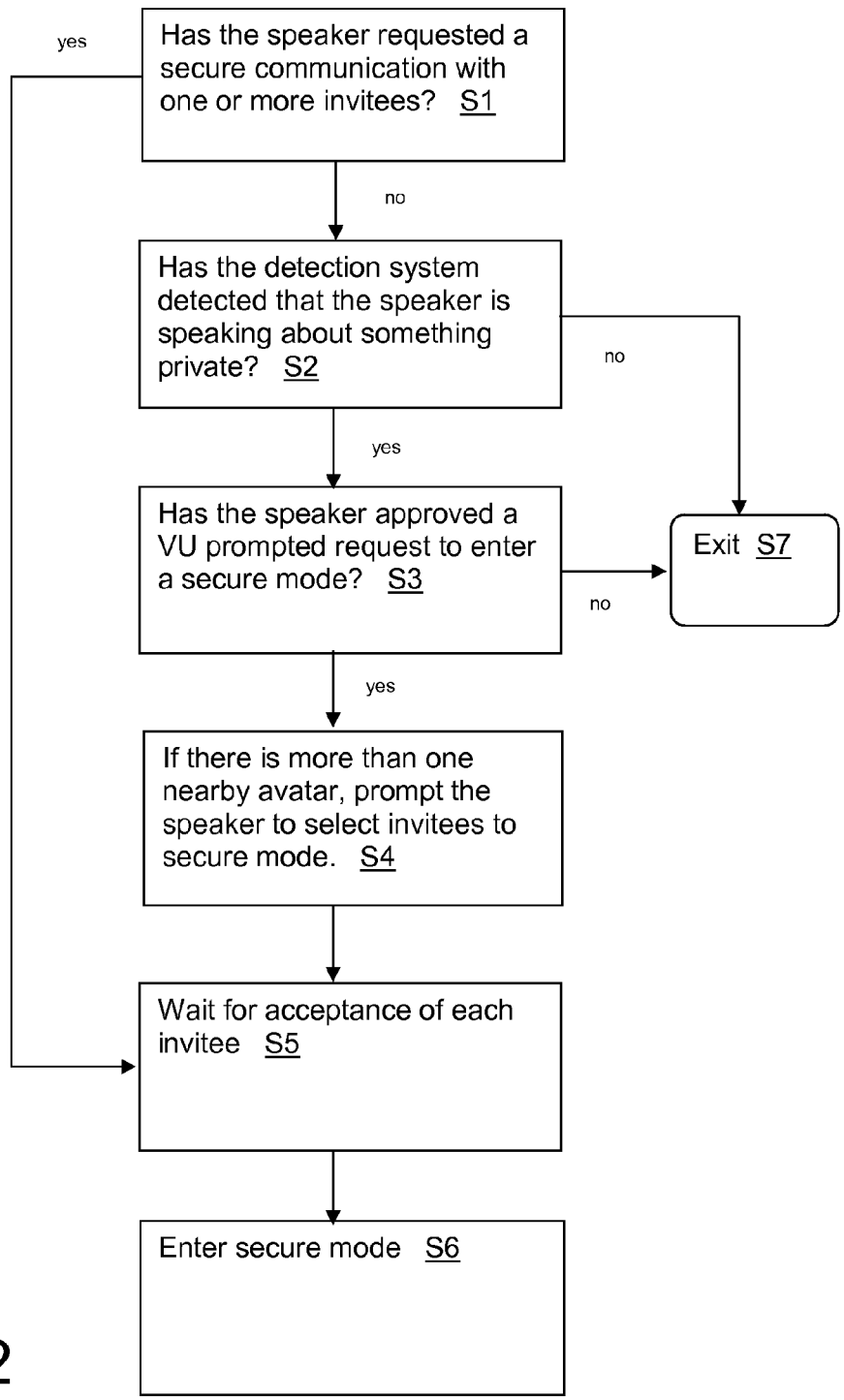
FIG. 2 depicts a flow chart showing a request/acceptance method in accordance with an embodiment of the present invention.

FIG. 2 describes a method for implementing such an embodiment, in which reference is made to the virtual universe 18 depicted in FIG. 1. At step S1, request/acceptance system 22 determines whether a speaker (i.e., an avatar typing, speaking, generating, etc., a message) has requested a secure communication with one or more invitees. If yes, request/acceptance system 22 waits for acceptance of each invitee at step S5, and enters secure mode at step S6. If no, detection system 23 determines if the speaker is speaking about something private at step S2. If no, the process exits at step S7. If yes, a determination is made at step S3 whether the speaker has approved a virtual universe prompted request to enter secure communication mode (i.e., has the speaker enabled this detection feature). If no, the process exits at step S7. If yes, the detection system 23 determines if there is more than one nearby avatar at step S4. If there is, the speaker is prompted to select one or more invitees to enter secure communication mode. If there is only one nearby avatar, the detection system 23 may simply prompt the speaker if he or she wants to enter secure communication mode. At step S5, request/acceptance system 22 waits for acceptance of each invitee, and enters secure mode at step S6.

The request prompt in steps S1 and S3 may optionally include the ability for the speaker to type or include a reason for the secure communication request.

Acceptance by an avatar at step S5 may also involve the use of a virtual universe prompt to enter a secure communication mode with the requesting (i.e., speaking) avatar. This may include a predefined or configurable time, which could be cancelled by the requester before the recipient declares a choice. If the recipient does not want to enter a secure communication mode, the requesting avatar is notified and the process exits.

Automatic approval or rejection of all requests or acceptances meeting a specified condition (such as requests from a specific avatar, time of day, etc.) may be configurable by the user. The notification of the requesting avatar may optionally allow the recipient avatar the ability to type or include a reason for a secure communication request rejection.

Referring again to FIG. 1, secure session implementation system 24 is responsible for setting up the security infrastructure when two or more users agree to engage in a secure communication mode. The type of security protocol to be provided can vary and may depend, e.g., on the requested needs of the participating users, the type of communication (e.g., physical, textual, etc.), the content of the communication, the location of the communication, the secure communication mode being sought, etc.

Once request and acceptance occur, a secure session is initiated. In one illustrative methodology, a virtual universe (VU) grid table 30 is provided for recording: (1) a secure session identifier for each ongoing secure session; and (2)

unique user identifiers (UUIDs) for each avatar participating in a secure session. The VU grid table 30 includes one or more entries that dictate what type of secure communication is being implemented within the context of the virtual universe 18, e.g., will encryption be used, will the avatars be hidden from other avatars, will the dialog simply be masked to other avatars, will the avatars be transported away, will uncontrolled avatar proxies be substituted for the hidden or transported avatars, etc.

As shown, secure session implementation system 24 may include an encryption system 25 for encrypting communications between two avatars. In other cases, the communication may be merely hidden to all other users. Illustrative encryption methods include, e.g., asymmetric RSA public/private key and symmetric DES shared key systems. This invention may use any known or future encryption algorithm to ensure messages between avatars in secure communication mode may be encrypted, and therefore impossible or difficult to intercept by a third party.

In an asymmetric key implementation, entering into secure communications mode triggers an automatic transfer of a public key file from one avatar or relevant system to the other. This may be accomplished by any infrastructure, including: Peer To Peer (P2P), from one user's VU client 38*a, b, c* to another's; maintaining and transferring files at the VU server system 10; maintaining private keys on each avatar's VU client 38*a, b, c*; a public key kept and transferred solely on the VU server system 10; etc. Using symmetric DES encryption method (and similar), both avatars would need to know the secret key.

VU characteristics alteration system 26 is responsible for altering at least one feature of the virtual universe 18 as required to effectuate the secure communication mode. Thus, when a group of avatars are engaged in a secure communication mode, notifications, physics, displays, avatar appearance, etc., may be altered according to established preferences. Preferences may be set by individual avatars or as a group preference, such as established by the requestor.

Avatars may permanently or temporarily exit, i.e., leave, a secure communication mode using a predefined action. If an avatar requests temporary leave from the secure communication mode, the alterations for the avatar are reversed and the VU grid table 30 is updated to note that this avatar is temporarily disconnected from the session, but may re-join upon request. (Such an avatar may later re-enter secure communication mode, such as via clicking an avatar in the mode or selecting an option.)

If an avatar requests complete leave from the secure communication mode, their UUID is removed from the associated secure session ID and their alterations are reversed. If there is only one avatar left, then the secure session ID is removed, and any alterations are reversed for that avatar.

VU characteristics alteration system 26, which alters one or more features of the virtual universe environment to provide security, may include visibility rules 27 that determine what should or should not be shown in the virtual universe 18. For example, an avatar may disappear from the virtual universe 18 during private conversations by, e.g., staying in its current location, but becoming invisible or amorphous to all users except those involved in the private session; being temporarily shuttled with all members of the private session to a secret quiet room; etc. Alternately, the avatars in a private session may remain visible to the rest of the world but non-participants would see that they are in privacy mode.

In the case where avatars engaged in a secure communication mode are hidden or teleported, some representation of the avatars (i.e., proxies) may be left visible in their original locations so that other avatars can still see some representation of the hidden or transported avatars. Thus, other avatars could interrupt the secure conversation, request to join, etc. The proxy avatars may simply be immobile representations, or be programmatically controlled to behave in a predetermined manner. Such behaviors may be dictated by the visibility rules 27.

Referring again to FIG. 1, VU server system 10 is shown as including a processing unit 12, a memory 16, at least one input/output (I/O) interface 14, and a bus 17. Further, the VU server system 10 may also include other facilities such as external devices and storage systems. In general, the processing unit 12 executes computer program code, such as virtual universe 18, that is stored in memory 16. While executing computer program code, the processing unit 12 can read and/or write data from/to the memory 16, a storage system, and/or I/O interface(s) 14. Bus 17 provides a communication link between each of the components in the computer system 10. External device(s) can comprise any device (e.g., display) that enables a user 32 to interact with the VU server system 10 or any device that enables the VU server system 10 to communicate with one or more other computer systems. Client computer 36 may include similar features.

Both client computer 36 and VU server system 10 can comprise any general purpose computing article of manufacture capable of executing computer program code installed thereon (e.g., a personal computer, server, handheld device, etc.). However, it is understood that the VU server system 10 is only representative of various possible computer systems that may perform the various processes of the invention. To this extent, in other embodiments, the client computer 36 and VU server system 10 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the virtual world infrastructure shown in FIG. 1 is only illustrative of various types of platforms that can be used to implement the present invention. For example, in an embodiment, the VU server system 10 can comprise two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that the various systems can be implemented independently, combined, and/or stored in memory for one or more separate computer systems that communicate over a network. Further, it is understood that some of the systems and/or functionality may not be implemented, or additional systems and/or functionality may be included as part of the invention.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 36 and/or a storage system (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the processes of the invention on a subscription, advertising, and/or fee basis. A service provider can create, maintain, support, etc., a VU server system 10 that performs the processes of the invention for one or more customers. In return, the service provider can receive payment from the customer(s) under a subscription and/or fee agreement and/or the service provider can receive payment from the sale of advertising space to one or more third parties.

In still another embodiment, a virtual universe 18 can be obtained (e.g., created, maintained, having made available to, etc.) and one or more systems for performing the processes of the invention can be obtained (e.g., created, purchased, used, modified, etc.) and deployed. To this extent, the deployment of each system can comprise one or more of (1) installing program code on a client computer 36, from a computer-readable medium; (2) adding one or more computer systems to the computer infrastructure; and (3) incorporating and/or modifying one or more existing systems of a computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and clearly, many modifications and variations are possible.

What is claimed is:

1. A system for providing secure communications in a virtual universe, comprising:
 a request/acceptance system for allowing a first avatar and a second avatar in the virtual universe to request and/or accept a secure communication mode with each other, wherein the request/acceptance system includes a detection system that automatically detects an unsecure communication occurring in the virtual universe between the first avatar and the second avatar, determines whether the unsecure communication between the first avatar and the second avatar appears to be of a sensitive nature that may be more suited to be conducted in the secure communication mode, and automatically prompts the first avatar and the second avatar to continue the communication in the secure communication mode;
 a system for initiating a secure session within the virtual universe between the first avatar and the second avatar in response to the first avatar and the second avatar expressing a desire to continue the communication in the secure communication mode; and
 a characteristics alteration system that alters a feature of the virtual universe to effectuate the secure communication mode.

2. The system of claim 1, wherein the system for initiating the secure session creates an entry in a grid table that records information pertaining to the secure session between the first avatar and the second avatar, each entry in the grid table including a unique session identifier that identifies the secure session between the first avatar and the second avatar, a unique user identifier that identifies each avatar participating in the session, and secure communication mode characteristics associated with the secure session that identify whether the communication is encrypted, whether the first avatar and the second avatar are visible to other avatars in the virtual universe, whether the first avatar and the second avatar were transported to a different location and whether avatar proxies were used by the first avatar and the second avatar.

3. The system of claim 1, wherein the system for initiating the secure session includes a mechanism for causing communications between the first and second avatars to be encrypted.

4. The system of claim 1, wherein the characteristics alteration system causes the first and second avatars to be teleported to a private area.

5. The system of claim 1, wherein the characteristics alteration system causes the first and second avatars to disappear.

6. The system of claim 1, wherein the characteristics alteration system causes other avatars not engaged in the secure communication mode to see proxy avatars in place of the first and second avatars.

7. The system of claim 6, wherein the other avatars can interrupt communication between the first and second avatar via the proxy avatars.

8. The system of claim 1, wherein the characteristics alteration system causes dialog between the first and second avatars to be hidden for other avatars.

9. The system of claim 1, wherein the characteristics alteration system causes gestures and inventory items exchanged between the first and second avatars to be hidden from other avatars.

10. A method of providing secure communications in a virtual universe, comprising:
 automatically detecting an unsecure communication occurring in the virtual universe between a first avatar and a second avatar;
 determining whether the unsecure communication between the first avatar and the second avatar appears to be of a sensitive nature that may be more suited to be conducted in a secure communication mode;
 automatically prompting the first avatar and the second avatar to continue the communication in the secure communication mode in response to determining that the unsecure communication appears to be of a sensitive nature;
 receiving an acceptance from the first avatar and the second avatar to continue the communication in the secure communication mode in response to automatically prompting the first avatar and the second avatar to continue the communication in the secure communication mode;
 initiating a secure session within the virtual universe between the first avatar and the second avatar in response to receiving the acceptance from the first avatar and the second avatar; and
 altering a feature of the virtual universe to effectuate the secure communication mode.

11. The method of claim 10, wherein the secure session creates an entry in a grid table that records information pertaining to the secure session between the first avatar and the second avatar, each entry in the grid table including a unique session identifier that identifies the secure session between the first avatar and the second avatar, a unique user identifier that identifies each avatar participating in the session, and secure communication mode characteristics associated with the secure session that identify whether the communication is encrypted, whether the first avatar and the second avatar are visible to other avatars in the virtual universe, whether the first avatar and the second avatar were transported to a different location and whether avatar proxies were used by the first avatar and the second avatar.

12. The method of claim 10, further comprising causing communications between the first and second avatars to be encrypted.

13. The method of claim 10, wherein the feature being altered is selected from the group consisting of: teleporting the first and second avatars to a private area; causing the first and second avatars to disappear; causing dialog between the first and second avatars to be hidden for other avatars; causing other avatars not engaged in the secure communication mode to see proxy avatars in place of the first and second avatars; and causing gestures and inventory items exchanged between the first and second avatars to be hidden from other avatars.

14. A program product stored on a computer readable storage device, which when executed by a computer system, provides secure communications in a virtual universe, the program product comprising:
program code for automatically detecting an unsecure communication occurring in the virtual universe between a first avatar and a second avatar;
program code for determining whether the unsecure communication between the first avatar and the second avatar appears to be of a sensitive nature that may be more suited to be conducted in a secure communication mode;
program code for automatically prompting the first avatar and the second avatar to continue the communication in the secure communication mode in response to determining that the unsecure communication appears to be of a sensitive nature;
program code for receiving an acceptance from the first avatar and the second avatar to continue the communication in the secure communication mode in response to automatically prompting the first avatar and the second avatar to continue the communication in the secure communication mode;
program code for initiating a secure session within the virtual universe between the first avatar and the second avatar in response to receiving the acceptance from the first avatar and the second avatar; and
program code for altering a feature of the virtual universe to effectuate the secure communication mode.

15. The program product of claim 14, wherein the secure session creates a first entry in a grid table that records information pertaining to the secure session between the first avatar and the second avatar, each entry in the grid table including a unique session identifier that identifies the secure session between the first avatar and the second avatar, a unique user identifier that identifies each avatar participating in the session, and secure communication mode characteristics associated with the secure session that identify whether the communication is encrypted, whether the first avatar and the second avatar are visible to other avatars in the virtual universe, whether the first avatar and the second avatar were transported to a different location and whether avatar proxies were used by the first avatar and the second avatar.

16. The program product of claim 14, further comprising program code for causing communications between the first and second avatars to be encrypted.

17. The program product of claim 14, wherein the feature being altered is selected from the group consisting of: teleporting the first and second avatars to a private area; causing the first and second avatars to disappear; causing dialog between the first and second avatars to be hidden for other avatars; causing other avatars not engaged in the secure communication mode to see proxy avatars in place of the first and second avatars; and causing gestures and inventory items exchanged between the first and second avatars to be hidden from other avatars.

18. A method for deploying an application for providing secure communications in a virtual universe, comprising:
providing a computer infrastructure being operable to:
automatically detect an unsecure communication occurring in the virtual universe between a first avatar and a second avatar;
determine whether the unsecure communication between the first avatar and the second avatar appears to be of a sensitive nature that may be more suited to be conducted in a secure communication mode;
automatically prompt the first avatar and the second avatar to continue the communication in the secure communication mode in response to determining that the unsecure communication appears to be of a sensitive nature;
receive an acceptance from the first avatar and the second avatar to continue the communication in the secure communication mode in response to automatically prompting the first avatar and the second avatar to continue the communication in the secure communication mode;
initiate a secure session within the virtual universe between the first avatar and the second avatar in response to receiving the acceptance from the first avatar and the second avatar; and
alter a feature of the virtual universe to effectuate the secure communication mode.

19. The method of claim 18, wherein the secure session creates an entry in a grid table that records information pertaining to the secure session between the first avatar and the second avatar, each entry in the grid table including a unique session identifier that identifies the secure session between the first avatar and the second avatar, a unique user identifier that identifies each avatar participating in the session, and secure communication mode characteristics associated with the secure session that identify whether the communication is encrypted, whether the first avatar and the second avatar are visible to other avatars in the virtual universe, whether the first avatar and the second avatar were transported to a different location and whether avatar proxies were used by the first avatar and the second avatar.

20. The method of claim 18, wherein the computer infrastructure is further operable to cause communications between the first and second avatars to be encrypted.

* * * * *